US012354824B2

(12) United States Patent
Stacom

(10) Patent No.: US 12,354,824 B2
(45) Date of Patent: Jul. 8, 2025

(54) DEVICE FOR THERMIONIC ARC EXTINCTION VIA ANODE ION DEPLETION

(71) Applicant: Stacom Engineering Company, North Chittenden, VT (US)

(72) Inventor: Frank P. Stacom, North Chittenden, VT (US)

(73) Assignee: Stacom Engineering Company, North Chittenden, VT (US)

( * ) Notice: Subject to any disclaimer, the term of this patent is extended or adjusted under 35 U.S.C. 154(b) by 198 days.

(21) Appl. No.: 18/141,662

(22) Filed: May 1, 2023

(65) Prior Publication Data

US 2023/0268140 A1 Aug. 24, 2023

Related U.S. Application Data

(63) Continuation of application No. 17/523,975, filed on Nov. 11, 2021, now Pat. No. 11,676,778, which is a continuation of application No. 16/819,582, filed on Mar. 16, 2020, now Pat. No. 11,211,209, which is a continuation of application No. 16/422,146, filed on May 24, 2019, now Pat. No. 10,872,739.

(51) Int. Cl.
*H01H 1/02* (2006.01)
*H01H 9/38* (2006.01)

(52) U.S. Cl.
CPC ................ *H01H 9/38* (2013.01); *H01H 1/02* (2013.01); *H01H 2201/026* (2013.01); *H01H 2227/002* (2013.01)

(58) Field of Classification Search
CPC .......... H01H 9/38; H01H 9/383; H01H 9/386; H01H 1/02; H01H 1/02372; H01H 2201/026; H01H 2227/002; H01H 33/12; H01H 33/122; H01H 33/121; H01H 33/70
USPC ...................................................... 218/18, 10
See application file for complete search history.

(56) References Cited

U.S. PATENT DOCUMENTS 3,140,373 A * 7/1964 Horn .................... H01H 1/0203 218/133
3,223,888 A 12/1965 Floris
(Continued)

FOREIGN PATENT DOCUMENTS

DE 3247681 6/1984
FR 2931303 11/2009
(Continued)

OTHER PUBLICATIONS

Circuit Breaker Main and Arcing Contacts: What's The Difference, Jul. 20, 2018.

*Primary Examiner* — William A Bolton
(74) *Attorney, Agent, or Firm* — Caldwell Intellectual Property Law

(57) ABSTRACT

A device for thermionic arc extinction via anode ion depletion. The device includes a body including an inner compartment. The inner compartment includes at least an arc shield housing at least two arcing contacts, wherein the two arcing contacts are zinc-plated. The at least two zinc-plated arcing contacts further comprise a thickness and contact area customized based on a desired corrosion time of the zinc, wherein the corrosion time corresponds to extinction of the arc. A sensor is associated with the device. The sensor is configured to operate the movement of the at least two arcing contacts.

20 Claims, 6 Drawing Sheets

(56) References Cited

U.S. PATENT DOCUMENTS

| | | | | |
|---|---|---|---|---|
| 3,801,760 | A | 4/1974 | Korte | |
| 3,979,704 | A | 9/1976 | Buckley et al. | |
| 4,310,736 | A * | 1/1982 | Takeuchi | H01H 33/66261 218/136 |
| 5,286,441 | A * | 2/1994 | Shibata | C22C 32/0021 419/21 |
| 5,403,983 | A | 4/1995 | Luoma | |
| 5,994,850 | A | 11/1999 | Seddon et al. | |
| 6,194,984 | B1 * | 2/2001 | Kappel | H01H 50/546 218/155 |
| 6,373,016 | B2 | 4/2002 | Brouillat et al. | |
| 6,392,512 | B1 | 5/2002 | Ferree et al. | |
| 6,934,134 | B2 | 8/2005 | Mori et al. | |
| 7,339,127 | B2 * | 3/2008 | Renner | H01H 1/02 200/268 |
| 9,105,412 | B2 * | 8/2015 | Inaba | H01H 1/0237 |
| 9,329,238 | B1 | 5/2016 | Carson et al. | |
| 9,552,934 | B2 | 1/2017 | Cardwell et al. | |
| 9,666,382 | B2 * | 5/2017 | Kuroda | C22C 5/10 |
| 2010/0170876 | A1 | 7/2010 | Bach et al. | |

FOREIGN PATENT DOCUMENTS

| | | |
|---|---|---|
| FR | 2931303 N | 11/2009 |
| IN | 01157MU2015 | 10/2016 |

* cited by examiner

DEVICE FOR THERMIONIC ARC EXTINCTION VIA ANODE ION DEPLETION

REFERENCE TO RELATED CASE

The present application is a continuation of U.S. patent application Ser. No. 17/523,975, entitled "METHODS AND SYSTEMS FOR DC CURRENT INTERRUPTER BASED ON THERMIONIC ARC EXTINCTION VIA ANODE ION DEPLETION", filed Nov. 11, 2021, which is a continuation of U.S. patent application Ser. No. 16/819,582 entitled "METHODS AND SYSTEMS FOR DC CURRENT INTERRUPTER BASED ON THERMIONIC ARC EXTINCTION VIA ANODE ION DEPLETION" filed Mar. 16, 2020, which is a continuation of U.S. patent application Ser. No. 16/422,146, entitled "METHODS AND SYSTEMS FOR DC CURRENT INTERRUPTER BASED ON THERMIONIC ARC EXTINCTION VIA ANODE ION DEPLETION" the contents of which are all hereby incorporated by reference in their entirety.

FIELD OF THE INVENTION

The present invention generally relates to the field of electrical circuits. In particular, the present invention is directed to methods and systems for a DC current interrupter based on thermionic arc extinction via anode ion depletion.

BACKGROUND

Circuit breakers are necessary in electrical power systems to isolate faulted parts of the system. AC circuit breaker technology relies on the AC current natural zero crossing for fault current interruption. High and medium voltage DC network development has been hampered by the lack of DC circuit breakers that provide acceptable performance in practical sizes at a reasonable cost. The lack of a natural zero crossing has been a challenge in interrupting DC fault currents.

SUMMARY OF THE DISCLOSURE

A device for thermionic arc extinction via anode ion depletion. The device includes a body including an inner compartment. The inner compartment includes at least an arc shield housing at least two arcing contacts, wherein the two arcing contacts are zinc-plated. The at least two zinc-plated arcing contacts further comprise a thickness and contact area customized based on a desired corrosion time of the zinc, wherein the corrosion time corresponds to extinction of the arc. A sensor is associated with the device. The sensor is configured to operate the movement of the at least two arcing contacts.

In another aspect, a method of thermionic arc extinction via anode ion depletion, the method comprising, creating a body including an inner compartment. The inner compartment comprising at least an arc shield housing at least two arcing contacts wherein the two arcing contacts are zinc-plated. Creating a thickness and contact area of the at least two zinc-plated arcing contacts wherein the thickness and contact area are customized based on a desired corrosion time of the zinc and wherein the corrosion time corresponds to extinction of the arc. Utilizing a sensor wherein the sensor is configured to operate the movement of the at least to arcing contacts.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for direct current (DC) interrupter based on thermionic arc extinction via anode ion depletion. In an embodiment, zinc plated arcing contacts including both an anode contact and a cathode contact may operate in parallel to current carrying contacts including a moveable contact and a fixed contact. Arcing contacts may draw an arc upon contact parting. Arc may be sustained so long as there is a supply of positive ions and electrons between anode arcing contact and cathode arcing contacts. Upon separation, zinc plated arcing contacts may corrode until the supply of zinc is limited. Corrosion of zinc may lead to increased arc resistance until there is zero flow of ions and electrons between anode arcing contact and cathode arcing contact. This will eventually extinguish the arc. In an embodiment, zinc plated thickness and contact area may be customized based on available short circuit level of a circuit and desired fault interrupting time. In an embodiment, zinc arcing contact may contain 0.1-10 millimeters of layered contact. Arcing contacts may be single use contacts so that other arcing contacts located within system 100 may be utilized to extinguish subsequent arcs. Single use arcing contacts may offer an advantage as single use arcing contacts reduce oxidation and resistance seen with multi-use arcing contacts.

Figure 1:
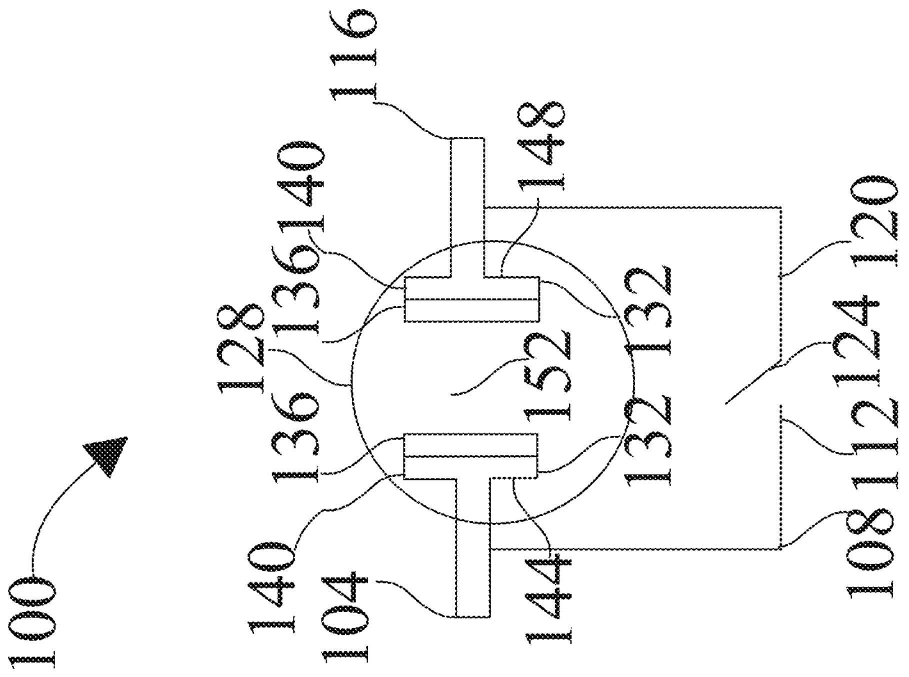
FIG. 1 is a block diagram illustrating a DC current interrupter system based on thermionic arc extinction via anode ion depletion system.

Referring now to FIG. 1, an exemplary embodiment of a system 100 for DC current interrupter based on thermionic arc extinction via anode ion depletion is illustrated. System 100 includes a fixed terminal end 104 including at least a fixed conductor 108 containing at least a fixed contact 112. Fixed terminal end 104 may include a fixed conductor 108, which as used herein, includes a stationary object or type of material within system 100 that allows electrical current to flow in one or more directions. Fixed terminal end 104 may include components such as fixed conductor and/or fixed contact that may be stationary and may not contain moving parts as compared to moveable terminal end as described in more detail below. Fixed conductor 108 may include a conductor that is stationary within system 100 and does not have any moving parts. Fixed conductor 108 may be composed of materials including metals, electrolytes, superconductors, semiconductors, plasmas, graphite, and/or conductive polymers. Fixed conductor 108 may be composed of metals such as for example, copper, annealed copper, silver, gold, mercury, brass, steel, aluminum, and the like. Fixed conductor 108 may carry varying amounts of current, reflected as ampacity. Fixed conductor 108 ampacity or amount of current carrying capacity may be related to material fixed conductor 108 is synthesized from. For example, a low resistance conductor material such as copper may carry a large amount of current. Fixed conductor 108 material may allow for electrical charge carriers such as electrons to move easily from atom to atom with the application of a voltage. Fixed conductor 108 may be of a certain size and shape depending on the type of circuit that fixed conductor 108 may be placed within. For example, fixed conductor 108 utilized in an air-blast circuit breaker may be different than fixed conductor 108 utilized in an oil circuit breaker. Circuit breaker as used herein is an electrical switch designed to isolate a faulted part of the power system. Fault may include when there is an abnormal electrical current. Fault may include a short in an electrical circuit or electrical system such as when there is an overload. Circuit breakers may be of varying sizes, voltage classes, current ratings and short circuit ratings, With continued reference to FIG. 1, a DC grid as described below in reference to FIG. 4, may isolate faulted parts of the grid with circuit breakers. In an embodiment, an activated circuit breaker may trip open the circuit and prevent the flow of current to a particular electrical line or circuit. In an embodiment a circuit breaker may be attached to a circuit at specific location. In an embodiment, a circuit breaker may be categorized according to the voltage level that the circuit breaker may break. For example, a high voltage circuit breaker may operate in a circuit greater than 72 kilovolts, a medium voltage circuit breaker may operate in a circuit between 35 kilovolts and 72 kilovolts, and a low voltage circuit breaker may operate in a circuit less than 35 kilovolts.

With continued reference to FIG. 1, fixed conductor 108 contains at least a fixed contact 112. Fixed contact 112 as used herein is a stationary piece of electrically conductive metal located within at least a fixed conductor 108. In an embodiment, fixed conductor contact 112 may be located on surface of at least a fixed conductor 108. In an embodiment, fixed conductor contact 112 may be located within fixed conductor 108. Fixed conductor contact 112 may be composed of conductive materials such as metals including for example, silver, gold, copper, aluminum, tungsten, zinc, and the like. Fixed contact 112 may include a contact that is stationary within system 100 and does not have any moving parts. Fixed contact 112 may be of a certain size and shape depending on the type of circuit that fixed contact 112 may be placed within. For example, fixed contact 112 utilized in an air-blast circuit breaker may be different than fixed contact 112 utilized in an oil circuit breaker. Fixed contact 112 may include bolted and/or crimped contacts. Crimped contact may include a forced contact that causes metal to flow and create a permanent connection. Bolted contacts may be used to secure an electrical component. Fixed contact 112 may contain slots, ridges, and/or grooves. In an embodiment, fixed contact 112 may include a ring of sprung copper contact fingers that may allow for a butt type insertion into moving contact as described in more detail below. In an embodiment, fixed contact 112 may include a solid rod of contacts that may be tipped with an arc resistant material to resist erosion from an arc as described in more detail below. In an embodiment, fixed contact 112 may carry an electrical current.

With continued reference to FIG. 1, system 100 includes a moveable terminal end 116 including at least a moveable conductor 120 containing at least a moveable contact 124. Moveable conductor 120, as used herein, includes a mobile object or type of material within system 100 that allows electrical current to flow in one or more directions. Moveable conductor 120 may include a conductor that is mobile within system 100 and may have moving parts. Moveable conductor 120 may move to touch and contact with fixed conductor 108. As used in this disclosure, a contact is moveable if it is configured to be moved into and out of contact with fixed contact. Moveable contact may be moveable by several mechanisms such as by a switch, spring, deformation shape, mechanical, and/or electrical control as described in more detail below. In an embodiment, moveable conductor 120 and fixed conductor 108 may touch as electrical current flows such as when a circuit breaker is closed. Moveable conductor 120 may move to be separated from fixed conductor 108 such as when a circuit breaker is open such as to produce an arc as described in more detail below, as a means to extinguish the electrical energy of a circuit. Moveable conductor 120 may be of a certain size and shape depending on the type of circuit that moveable conductor 120 may be placed within. For example, moveable conductor 120 utilized in an air-blast circuit breaker may be different than moveable conductor 120 utilized in an oil circuit breaker.

With continued reference to FIG. 1, moveable conductor 120 contains at least a moveable contact 124. Moveable contact 124 as used herein is a moveable piece of electrically conductive metal located within at least a moveable conductor 120. In an embodiment, moveable conductor contact 124 may be located on surface of at least a moveable conductor 120. In an embodiment, moveable conductor contact 124 may be located within moveable conductor 120. Moveable conductor contact 124 may be composed of conductive materials such as metals including for example, silver, gold, copper, aluminum, tungsten, zinc, and the like. In an embodiment, moveable conductor contact 124 may be composed of different materials than moveable conductor 120. For example, moveable conductor 120 may be composed of copper and moveable contact 124 may be composed of tungsten. In yet another non-limiting example, moveable conductor 120 may be composed of silver and moveable contact 124 may be composed of copper. In an embodiment, moveable terminal end 116 may be composed of different materials than fixed terminal end 104. For example, moveable terminal end 116 may be composed of silver while fixed terminal end 104 may be composed of tungsten. Moveable contact 124 may include a contact that is mobile within system 100 and may contain moving parts. In an embodiment, moveable contact 124 may move at a certain speed such as 10 meters per second or higher. Moveable contact 124 may be of a certain size and shape depending on the type of circuit that moveable contact 124 may be placed within. For example, moveable contact 124 utilized in an air-blast circuit breaker may be different than moveable contact 124 utilized in an oil circuit breaker. Moveable contact 124 may contain slots, ridges, and/or grooves. In an embodiment, moveable contact 124 may include a ring of sprung copper contact fingers that may allow for a butt type insertion into fixed contact 112 as described in more detail below. In an embodiment, moveable contact 124 may include a solid rod of contacts that may be tipped with an arc resistant material to resist erosion from an arc as described in more detail below. In an embodiment, moveable contact 124 may carry an electrical current. Moveable contact 124 may contain an elastically deformed shape whereby moveable contact may be elastically deformed and may generate an elastic/spring recoil force urging moveable contact 124 into electrical connection with fixed contact 112 and/or fixed terminal end 104. Elastically deformed shape may result in tensile pulling forces, compressive pushing forces, shear, bending and/or torsion twisting.

With continued reference to FIG. 1, moveable terminal end 116 may be moveable by several different mechanisms. In an embodiment, moveable terminal may include a sliding feature that allows for moveable terminal end 116 to slide and touch fixed terminal end 104. In such an instance, moveable conductor 120 may touch and interface with fixed conductor 108. In an embodiment, moveable conductor 120 may interface with fixed conductor 108 so that moveable conductor contact 124 is in direct contact and touches fixed conductor contact 112. Sliding feature may allow for moveable terminal end 116 to slide and touch fixed terminal end 104, whereby both contacts will touch and be in closed position. To open, moveable terminal end 116 may slide out so that moveable terminal end 116 no longer touches fixed terminal end 104. In an embodiment, moveable terminal end 116 may interface with fixed terminal end 104 through a contact mechanism that allows for moveable contact 124 to touch directly with fixed contact 112 such as through a butt contact. In such an instance, one end such as fixed contact 112 may contain an aperture that is designed and configured to fit into a depression located on other end such as moveable contact 124. Aperture may include a projection of a certain size that may extend from surface of one contact such as fixed contact 112 and fit within a depression or groove of a corresponding equal size located on surface of another contact such as moveable contact 124. In an embodiment, moveable terminal end 116 may include a mechanical pressure that may allow for the moveable terminal to touch fixed terminal end 104. Mechanical pressure may include a potential energy store that may be released when a signal is given to the moveable terminal end 116 that may cause the moveable terminal end 116 to slide and touch the fixed terminal end 104. Potential energy store may include a metal spring that may contain compressed air or hydraulic pressure through which potential energy may be stored in the moveable terminal. Upon mechanical pressure the potential energy may be released and cause the moveable terminal contact to slide at a certain speed. Upon mechanical pressure the potential energy may be transformed into kinetic energy that may create the driving force for the moving contacts. In an embodiment, contacts such as moveable contacts may be connected to an operating mechanism through a gear level arrangement or switch gear. In an embodiment, moveable terminal end 116 may include an electrical connection that may control movement of moveable contact. Moveable terminal end 116 may be operated by an external operating mechanism that may drive the moving contact, thereby opening and/or closing the connected circuit. Moveable contact 124 may be operated by for example push buttons, switches, mechanical pressure, sensors, electromechanical relays, and the like With continued reference to FIG. 1, system 100 includes a body including an inner compartment, wherein the inner compartment includes at least an arc shield 128 housing at least two arcing contacts 132. Inner compartment, as used herein includes a space housing at least an arc shield 128. Arc shield 128, as used herein, includes a stationary object or type of material device that aids in containing an arc. An arc may include light and heat produced from an arc fault due to contact opening. In an embodiment, an arc may include a dielectric breakdown such as when current flows through an electrical insulator and voltage applied across it exceeds the breakdown voltage, thereby resulting in the electrical insulator to become electrically conductive. Dielectric breakdown may be momentary or may lead to a continuous arc if a protective device such as a circuit breaker fails to interrupt current in a power circuit. Electric arc may experience negative incremental resistance, which may cause electrical resistance to decrease as arc temperature increases. As electrical arc develops and increases in temperature, the resistance may drop drawing current away until arcing contacts 132 separate and extinguishes the arc. Arc shield 128 may suppress and extinguish an arc utilizing arc suppression. Suppressing and extinguishing an arc may aid in reducing contact damage from arcing thereby reducing maintenance on arc shields 128 and other components of circuit breaker that may be affected.

With continued reference to FIG. 1, arc shield 128 includes at least two arcing contacts 132. Arcing contact 132 as used herein is a piece of electrically conductive material. Arcing contact 132 may be designed to prevent contacts located at moveable terminal end 116 and fixed terminal end 104 from being damaged when the arc develops. Arcing contact 132 may be fabricated with a first conducting material having a first vaporizing point and a second conducting material having a second vaporizing point. In an embodiment, first conducting material may be of varying thickness and may be of a varying surface area as described below in more detail in reference to FIG. 5. In an embodiment, second conducting material may be of varying thickness and may be of a varying surface area. In an embodiment, arcing contacts may be fabricated with a first conducting material of zinc having a vaporizing point from about 870 degrees Celsius to 950 degrees Celsius and a second conducting material of steel having a vaporizing point from about 2700 degrees Celsius to 2900 degrees Celsius. In an embodiment, arcing contacts 132 may be fabricated with zinc plated steel, whereby zinc may be located on exterior surface of arcing contacts 132 and be of a certain thickness and surface area while steel may be located underneath and below zinc. In an embodiment, first conducting material may have a lower vaporizing point than second conducting material. Arcing contact 132 may be composed of a first conducting material such as an arcing layer 136 and a second conducting material such as a base layer 140. Arcing contact 132 arcing layer 136 may be composed of low vaporizing temperature, conductive materials such as metals including for example, magnesium, cadmium, and zinc. Arcing contact 132 base layer 140 may be composed of high vaporizing temperature, conductive materials such as metals including for example, steel, aluminum, and tungsten. Arcing contact 132 may be of a certain size and shape depending on the type of circuit that arc contact may be placed within. For example, arcing contact utilized in an air-blast circuit breaker may be different size, shape, and materials than arcing contact utilized in a vacuum circuit breaker. Arcing contacts 132 may include at least an anode contact 144 and at least a cathode contact 148. Anode arcing contact 144 as used herein includes a contact through which positive ions leave. Cathode arcing contact 148 as used herein includes a contact through which electrons leave. Arcing contacts 132 including both anode arcing contact 144 and cathode arcing contact 148 may be of varying sizes and shapes ranging from small to very large depending on factors such as voltage requirements, usage, as well as type of circuit breaker as described in more detail below. In an embodiment, arcing contacts 132 may include a moving arcing contact and a fixed arcing contact. Moving arcing contact as used herein, includes a mobile object or type of material that allows electrical current to flow in one or more directions. Fixed arcing contact as used herein, includes a fixed object or type of material that allows electrical current to flow in one or more directions. When circuit breaker is closed, moving arcing contact may be in physical contact with fixed arcing contact and electrical current is conducted throughout the electrical circuit. When circuit breaker is opened, moving arcing contact 132 may part from fixed arcing contact 132 and thereby stopping electrical current to flow throughout the electrical circuit. Moving arcing contact 132 may operate in parallel with moveable conductor contact 124 so that when movable conductor contact is triggered to separate from fixed terminal contact 112, moving arcing contact separates from fixed arcing contact at the same time. In an embodiment, anode arcing contact 144 may be moving arcing contact and cathode arcing contact 148 may be fixed arcing contact. In an embodiment, anode arcing contact 144 may be fixed arcing contact and cathode arcing contact 148 may be moving arcing contact. Moving arcing contacts may be operated by a spring force such as the one described above in reference to moveable conductor contact 124 or by DC solenoids. Moving arcing contact may be operated by a switch, such as the switch as described above in reference to moveable conductor contact 124. Switch may include for example, an electrical switch and/or a mechanical switch. Moving arcing contact may be operated by an external operating mechanism that may drive the moving contact, thereby opening and/or closing the connected circuit. Moving arcing contact may be operated by for example push buttons, switches, mechanical pressure, sensors, electromechanical relays, and the like.

With continued reference to FIG. 1, anode arcing contact 144 and cathode arcing contact 148 may be positioned into an open or closed position based on formation of an electrical arc. In an embodiment, arcing contacts 132 may operate in parallel with moveable conductor contact 124 and fixed conductor contact 112. For example, when a circuit breaker is triggered, moveable terminal end 116 may separate from fixed terminal end 104 contact thereby forming open position. Arcing contacts 132 may simultaneously separate thereby drawing out the electrical arc across the air gap located between the anode arcing contact 144 and the cathode arcing contact 148. Drawing out the electrical arc across the air gap located between the anode arcing contact 144 and the cathode arcing contact 148 may help in protecting moveable terminal contact and stationary terminal contact from damage. In an embodiment, arcing contacts 132 may not separate simultaneously as moveable conductor contact 124 and fixed conductor contact 112 but rather may separate after moveable conductor contact 124 has separated from fixed conductor contact 112. In an embodiment, arcing contacts may separate first followed by moveable conductor contact 124 separating from fixed conductor contact 112.

With continued reference to FIG. 1, anode arcing contact 144 and cathode arcing contact 148 may be fabricated from a first material having a first vaporizing point. In an embodiment, arcing contacts 132 may be fabricated from first conducting material such as arcing layer 136 such as zinc sourced from zinc plated steel with zinc located on surface of arcing contacts and having a first vaporizing point, and a second conducting material such as base layer 140 including steel located beneath zinc surface having a second vaporizing point. In such an instance, zinc may have a lower vaporizing point of around 907 degrees Celsius and steel may have a higher vaporizing point of around 2792 degrees Celsius. In an embodiment, moveable terminal contact and fixed terminal contact may be composed of material such as copper or silver and anode arcing contact 144 and cathode arcing contact 148 may be fabricated from zinc plated steel. Zinc plated steel utilized in arcing contacts 132 may have a vaporizing point of about 870 degrees Celsius to 950 degrees Celsius. In such an instance, upon opening of circuit breaker due to a short in an electrical connection, moveable terminal contact 108 and arcing contacts 132 may operate in parallel to open and separate. Zinc plated arcing contacts 132 may then draw an arc upon contact parting, and the arc may be sustained as long as there is an ample supply of positive ions and electrons from the anode arcing contact 144 and the cathode arcing contact 148. Zinc plated anode arcing contact 144 may rapidly corrode as the current from the arc flows through the arcing contacts 132 until the supply of zinc is limited and the arc extinguishes. As the zinc corrodes arc resistance may increase until the arc can no longer be sustained and extinguishes. In an embodiment, the zinc plated anode arcing contact 144 and the zinc plated cathode arcing contact 148 may contain varying amounts of zinc plating thickness as well as varying size contact areas on the arcing contact 132. In such an instance, zinc plating thickness on arcing contacts 132 as well as contact area located on arcing contacts 132 may be customized based on available short circuit level of an electrical system as well as the desired fault interrupting time. In an embodiment, arcing layer 136 may be of a certain thickness and base layer 140 may be of a certain thickness. Arcing contacts 132 may be designed to prevent moveable contact 124 and fixed contact 112 from being damaged during formation and extinguishment of an arc. In an embodiment, arcing contact 132 surface may be shaped to have a rubbing motion known as "wipe." Wipe may assist in cleaning contact surface of arcing contacts 132 so that where one arcing contact 132 is contoured the other is flat. In an embodiment, arcing contacts 132 may contain a horn to facilitate arc transfer. In an embodiment, arcing contacts 132 may be composed of materials which may include tungsten, mercury, nickel, silver alloys, cadmium, zinc, any combination of the above, and the like. In an embodiment, arcing contact 132 material may be the same material as moving contact 124 and fixed contact 112. In an embodiment, arcing contact 132 material may be different than moving contact 124 and fixed contact 112.

With continued reference to FIG. 1, arcing contacts 132 including zinc plated anode arcing contact 144 and zinc plated cathode arcing contact 148 may be single use. In an embedment, after zinc fabricated arcing contacts 132 are utilized to extinguish an arc, new zinc fabricated arcing contact 132*s* may be replaced within the circuit breaker. In an embodiment, arcing shield 128 may contain features such as for example snaps, hooks, bolts, screws, nuts, and the like that may allow for arc shield 128 and/or arcing contacts 132 to be easily removed and replaced after user. Single use arcing contacts 132 such as zinc plated steel arcing contacts 132 may be customized based on zinc plating thickness and contact surface area to be utilized in a variety of circuit breakers including vacuum interrupter circuit breakers, air blast circuit breaker, sulfur hexafluoride ($SF_6$), and/or oil circuit breakers. Single use arcing contacts 132 such as zinc plated steel arcing contacts 132 may be utilized to extinguish an arc found in an AC or DC circuit. Single use arcing contacts 132 may be of a certain size and shape and have certain surface area of zinc fabricated coating based on factors such as type of circuit breaker to be inserted into, voltage of circuit breaker, current carrying capacity of the circuit breaker and the like. In an embodiment, arcing shield 128 may be single use.

With continued reference to FIG. 1, system 100 may be utilized in a vacuum interrupter circuit breaker. A vacuum interrupter may use electrical contacts in a vacuum and may be incorporated into medium-voltage circuit breakers, generator circuit-breakers, and/or high-voltage circuit breakers. Vacuum interrupter may be used for example in utility power transmission systems, power generation units, power distribution for railway, arc furnace uses, and/or industrial plants. Vacuum interrupter circuit breaker may utilize rapid dielectric recovery and high dielectric strength of vacuum. In an embodiment, system 100 may be hermetically sealed in a vacuum envelope. Vacuum envelope may be composed of materials such as hermetically sealed glass, ceramic, and/or metal. Moveable terminal end 116, may be moved by a flexible bellow. When circuit breaker is in closed position, moveable contact 124 may be touching fixed contact 112 and anode contact 144 may be touching cathode contact 148. When circuit breaker is in closed position electrical current is flowing throughout the electrical circuit with a certain level of contact resistance. When circuit breaker is opened, moveable contact 124 is parted and physically not in contact with fixed contact 112 by a flexible bellow, and arcing contacts 132 may simultaneously separate as well in parallel, thereby producing an arc that may be supported by zinc vapor found on arcing contact 132 surfaces until the arc resistance increases and eventually extinguishes. In an embodiment, vacuum circuit breaker may separate moveable contact 124 from fixed contact 112 and arcing contacts 132 from one another by bellow. Bellow may include a device constructed to furnish a blast of air. Bellow may include for example, a valve that may allow for air to fill a cavity when expanded and a tube through which air may be forced out when the cavity is compressed. Bellow may include for example, a flexible bag that can have volume adjusted by compression or expansion. In an embodiment, moving contact may be moved into open position. Moving contact may be operated by a bellow. Bellow may allow the moving contact to be operated from outside the vacuum interrupter enclosure and may aid in maintaining a vacuum space. Vacuum may include any space devoid of matter. In an embodiment, bellow may be made of a certain material such as stainless steel and may be composed of a certain level of thickness. When a pair of contacts are separated such as by an insulating gap 152 and considered to be "open" the pair may not pass a current. Insulating gap 152 may include a medium separating at least a contact which may include for example, air, vacuum, oil, sulfur hexafluoride, and/or an electrically insulating fluid. Moving contact and/or arcing contacts 132 may be operated by an external operating mechanism that may drive the moving contact and/or arcing contacts 132, thereby opening and/or closing the connected circuit. Moving contact and/or arcing contacts 132 may be operated by for example push buttons, switches, mechanical pressure, sensors, electromechanical relays, and the like. In an embodiment, when current is flowing, contacts may be in closed position. When current needs to be interrupted, contacts may be moved into an open position. In an embodiment, a vacuum interrupter containing system 100 may extinguish a circuit by separating moveable contact 124 and arcing contacts 132 by bellow. This may cause an increase in resistance between the contacts and increase temperature at the contact surface until electrode-metal evaporation occurs. The gap between the contacts may continue to widen until the arc becomes non-conductive, extinguishes, and the current is interrupted.

In an embodiment, system 100 may be inserted into an air blast circuit breaker. Air blast circuit breaker may utilize air as insulating gap 152. In an embodiment, moveable contact 124 and fixed contact 112 as well as arcing contacts 132 may be in "closed" position whereby current is able to flow between the contacts. In such an instance, fixed contacts and moving contacts as well as arcing contacts 132 may be held in closed position by a spring pressure. A blast of air may force the contacts into "open" position thereby creating an arc to be formed between the arcing contacts 132, In an embodiment, a blast of air may be created by a blast valve that may be located within the air blast circuit breaker. In an embodiment, blast valve may be attached to arcing chamber and may control air flow into the arcing chamber. A fault may trigger a tripping impulse thereby causing the air valve to open and air to enter the arcing chamber. Air may push away the moving arcing contact 132 against the spring pressure. Moving arcing contact may then be separated from fixed arcing contact and an arc may be formed. Moving arcing contact may be separating in parallel and at the same time as moveable contact 124 from fixed contact 112. High pressure air blast may flow along the arc and remove ionized gases with it. Consequently, the arc may be extinguished, and the current flow may be interrupted. Air may be compressed to high pressure so that when contacts including moveable contact 124 and arcing contacts 132 separate, a blast valve is opened to discharge high pressure air to the ambient. In an embodiment, blast valve may trigger an air blast to be directed in arc chamber at certain angles such as to direct an air blast at right angle to the arc. This may length and cause the arc to transition into a suitable chute for arc extinction. When the moving arcing contact is opened, an arc may be struck between fixed arcing contact and moving arcing contact. This right angle blast may then force the arc into a chute consisting of arc splitters and baffles. The splitters may increase the length of the arc and the baffles may provide improved cooling.

In an embodiment, system 100 may be inserted into a sulfur hexafluoride (SF) circuit breaker. Sulfur hexafluoride may use sulfur hexafluoride gas to assist in quenching an arc. In an embodiment, sulfur hexafluoride may be utilized as an insulating gap 152. In an embodiment, moveable contact 124 and fixed contact 112 as well as arcing contacts 132 may be in "closed" position whereby current is able to flow between the contacts. In an embodiment, circuit may be interrupted by separating moveable contact 124 from fixed contact 112 and moving arcing contact from fixed arcing contact in a medium, such as sulfur hexafluoride. After separation, current may be carried through an arc and may be interrupted when the arc is extinguished by the zinc plated arcing contact as free electrons are absorbed from the anode arcing contact 144, thereby building arc resistance. In an embodiment, the arc may be further cooled by the sulfur hexafluoride gas medium. The sulfur hexafluoride gas may absorb free electrons to form relatively immobile negative ions. This loss of conducting electrons in the arc may assist to build up enough insulation strength to extinguish the arc. Sulfur hexafluoride may be delivered into arc chamber such as by thermal blast chambers, self-blast chambers, double motion of contacts, and/or thermal blast chambers with arc-assisted openings.

In an embodiment, system 100 may be inserted into an oil circuit breaker. Oil circuit breaker may use an oil to assist in quenching an arc. Oil circuit breakers may be utilized at transmission voltages below 345 kV. In an embodiment, an oil may be utilized as insulating gap 152. Oil circuit breaker may contain moveable contact 124, fixed contact 112, and arcing contacts 132 that may be in closed position as contacts carry current and the circuit breaker is closed. In an embodiment, arcing contacts 132 may be located in interrupting chamber of oil circuit breaker, specifically in the explosion pot. Zinc arcing contacts 132 surrounded by oil may assist in heating up the arc to decompress the zinc located on anode arcing contact 144 and cathode arcing contact 148 and to produce gases such as hydrogen that may generate high pressure. Contacts may move apart when a fault occurs in the system such as when there is an abnormal electrical current. A fault may occur for example, when current bypasses normal loads. When a fault occurs, moveable contact 124 may separate from fixed contact 112 and arcing contacts 132 may move apart in parallel, and an arc may form between the arcing contacts 132. When an arc forms, heat may be liberated, and a high temperature may be reached thereby vaporizing the surrounding oil into gas.

Figure 2:
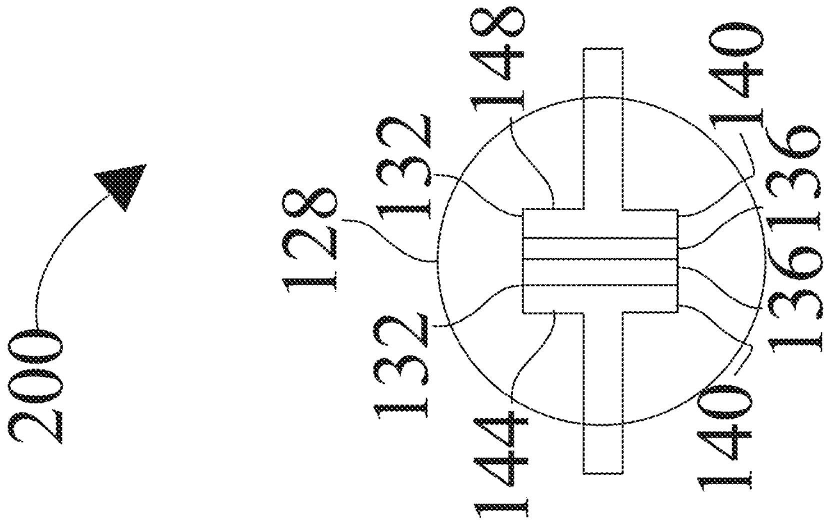
FIG. 2 is a block diagram illustrating an exemplary embodiment of closed arcing contacts.

Referring now to FIG. 2, an exemplary embodiment of arcing contacts 132 in closed position is illustrated. In an embodiment, when system 100 is inserted into a circuit breaker, circuit breaker may be in closed or open position. Circuit breaker may include any of the circuit breakers as described above in reference to FIG. 1. Circuit breaker in closed position allows for electrical current to flow throughout electrical circuit as moving arcing contact and fixed arcing contact are touching and in contact. In an embodiment, arcing contacts 132 may be carrying high currents at high voltages. When circuit breaker is in closed position, arcing contacts 132 are touching allowing for electrical current to flow. When circuit breaker is in closed position, insulating gap 152 does not exist as arcing contacts 132 are touching. Conductive material such as zinc coating located on surface arcing contacts 132 provides a path for electrical current to flow. In an embodiment, first conductive material may include arcing layer 136 consisting of zinc and second conductive material may include base layer 140 consisting of steel. In an embodiment, surfaces that touch between anode arcing contact 144 and cathode arcing contact 148 may be comprised of a number of small surfaces known as microcontacts spread randomly throughout the anode arcing contact 144 and cathode arcing contact 148 that together constitute the contact area of the arcing contacts 132. An advantage of single use zinc plated arcing contacts 132 is that oxidation of arcing contacts 132 occurs over time with use. Eventually an oxide layer forms extending to a significant number of microcontacts and as such leading to current bearing surface area to reduce, thus increasing resistance. As resistance increases, contact temperature increases leading to its destruction. Increased resistance may ultimately lead to failure of the circuit breaker. Single use arcing contacts 132 and/or single use arcing shield 128 provide an advantage as oxidation and resistance do not develop from repeated use of quenching arcs, thus preserving surface of zinc plated arcing contacts 132 to provide a new arcing contact 132 surface is utilized. Further, single use arcing contacts 132 are not subjected to contact wear that can affect resistance due to movement and friction of the arcing contacts 132 as well as electrical wear due to the arc effect. Further, repeated use of arcing contacts 132 can cause accelerated oxidation, as contact surfaces experience a cycling movement relative to each other. For example, disproportionate wear on surface of arcing contacts 132 that touch one another may cause contacts to no longer close at the same time, thus greatly impacting current carrying capacity as well as impacting extinguishing an arc.

Figure 3:
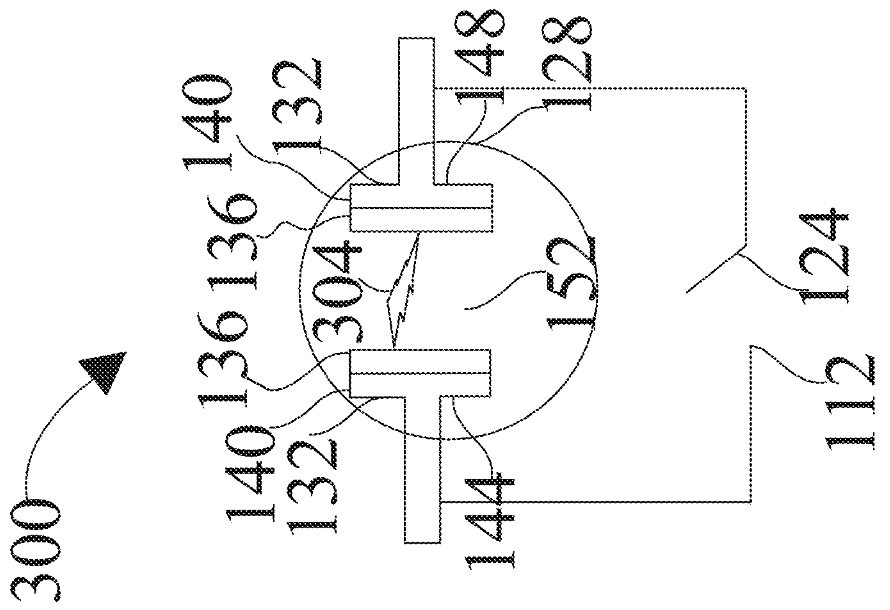
FIG. 3 is a block diagram of arcing contacts during arc formation.

Referring now to FIG. 3, an exemplary embodiment of arcing contacts 132 during formation of an arc is illustrated. In an embodiment, circuit breaker may open, causing separation of arcing contacts 132 as well as separation of moveable contact 124 and fixed contact 112, thereby forming an insulating gap 152. In an embodiment, arcing contacts 132 may separate in parallel from moveable contact 124 and fixed contact 112, with both sets of contacts separating simultaneously at the same time. In an embodiment, separation may occur in sequence, whereby moveable contact 124 may separate from fixed contact 112 first, followed by anode arcing contact 144 separating from cathode arcing contact 148. In yet another embodiment, separation may occur in sequence, whereby anode arcing contact 144 may separate from cathode arcing contact 148 first, followed by moveable contact 124 which may then separate from fixed contact 112. Contacts may be separated by a spring force such as the one described above in reference to FIG. 1. Moving contacts including moving contact 124 and moving arcing contacts 132 may be operated by a switch, such as the switch as described above in reference to FIG. 1. Switch may include for example, an electrical switch and/or a mechanical switch. Moving contacts may be operated by an external operating mechanism that may drive the moving contact, thereby opening and/or closing the connected circuit. Moving contact may be operated by for example push buttons, switches, mechanical pressure, sensors, electromechanical relays, and the like. Physical separation of arcing contacts 132 within the arc shield 128 located within circuit breaker may cause arcing contacts 132 such as anode arcing contact 144 and cathode arcing contact 148 to no longer touch leading to a disruption in electrical current. Microcontacts between anode arcing contact 144 and cathode arcing contact 148 as described above in FIG. 2 may no longer be in contact and thus formation of an insulating gap 152 may appear. Upon separation, zinc fabricated anode arcing contact 144 and zinc fabricated cathode arcing contact 148 will draw an arc 304. In an embodiment, arcing layer 136 located on anode arcing contact 144 and arcing layer 136 located on cathode arcing contact 148 may be of equal thickness. After quenching an arc 304, arcing layer 136 located on anode arcing contact 144 may decrease as described in more detail below in FIGS. 5A-B. Arc 304 may include any of the arcs as described above in FIGS. 1-2. Arc 304 will be sustained as an ample supply of positive ions and positive electrons flow from the anode arcing contact 144 and an ample supply of negative ions and negative electrons flow from the cathode contact 148. However, supply will start to reduce as anode arcing contact 144 and cathode arcing contact 148 are physically separated. Zinc plated anode arcing contact 144 will corrode increasing arc resistance and ultimately extinguishing the arc. In an embodiment, high current densities present during opening of arcing contact 132 opening due to high current flow may result in heating of the zinc plated arcing surface and release of metal vapor and resulting arc that forms. As the arc is formed, arc resistance will be zero and current may continue to flow through the arc plasma and arcing anode contact 144 and arcing cathode contact 148. The arc may transition to thermionic state with metal vapor continuing to be released from anode arcing contact 144 and cathode arcing contact 148. Current will continue to flow through the arc as long as positive ions and electrons flow from the anode arcing contact 144 to the cathode arcing contact 148. Current flow will cause corrosion of arcing contact 132 surface which will cause zinc to restrict positive ion flow at arcing contact 132, thus causing arc resistance to grow and the arc to eventually extinguish. Steel located below surface of zinc surface such as steel found at base layer 140 may never reach the required temperature for ion emission to support the arc as steel has a much higher vaporizing point than zinc. In an embodiment, zinc plated thickness and contact area may be optimized based on the available short circuit level of the circuit as well as the desired fault interrupting time. For example, arcing layer 136 containing zinc may be optimized to a certain thickness.

Figure 4:
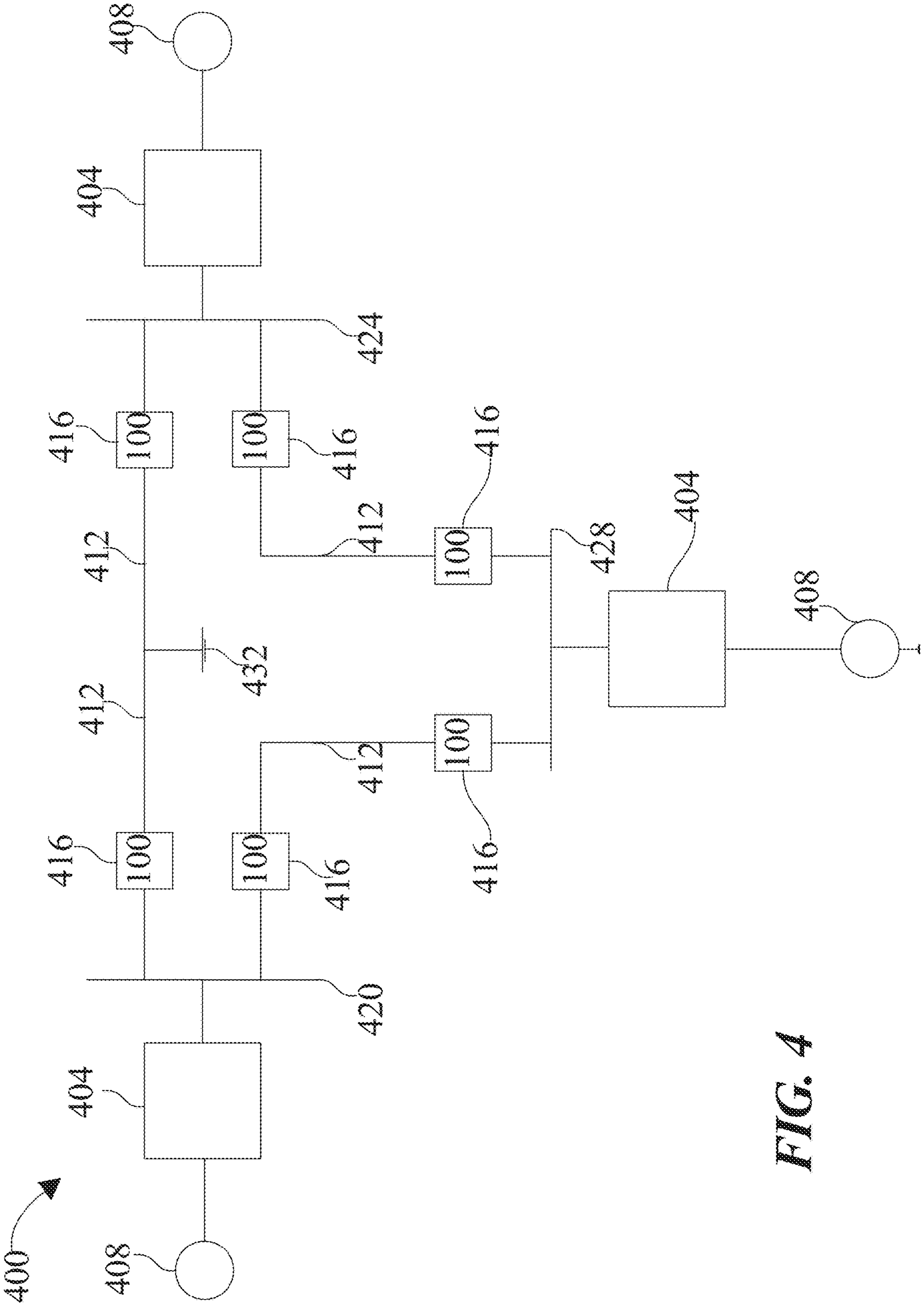
FIG. 4 is a block diagram illustrating an exemplary embodiment of a DC current interrupter system used within a DC grid.

Referring now to FIG. 4, an exemplary embodiment of system 100 utilized in a DC: Grid 400 is illustrated. In an embodiment, DC grid 400 may include circuit breakers containing system 100 to isolate a fault that may occur, such as one between stations on a DC grid. DC grid 400 may include three AC/DC converter stations 404 fed from AC system equivalents 408. DC grid 400 may include three +/−100 KV transmission lines 412. In an embodiment, DC grid 400 may include six dual pole circuit breakers 416 each containing system 100, In an embodiment, DC grid 400 may contain Station A 420. In an embodiment, DC grid 400 may contain Station B 424. In an embodiment, DC grid 400 may contain Station C 428. In an embodiment, if a positive or negative pole to ground fault 432 were to occur on the +/−100 KV transmission line 412 connecting Station A 420 and Station B 424, then the respective positive or negative pole of circuit breaker 416 containing system 100 would open to isolate the fault. In an embodiment, if a fault were to occur between line 412 connecting Station B 424 and Station C 428, then dual pole circuit breakers 416 each containing system 100 would open to isolate the fault.

Figure 5A:
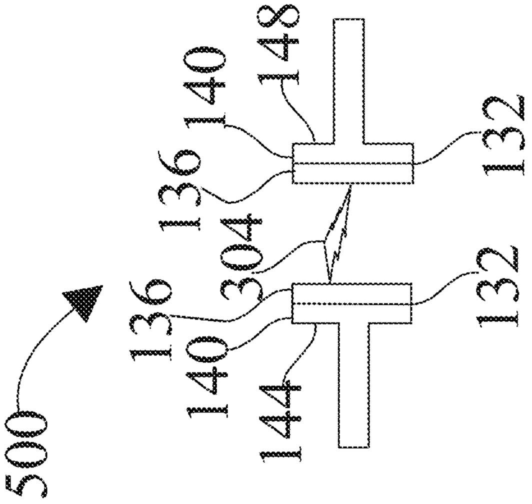
FIGS. 5A-B are block diagrams illustrating exemplary embodiments of conducting materials during formation of an arc and after extinguishment of an arc.
Figure 5B:
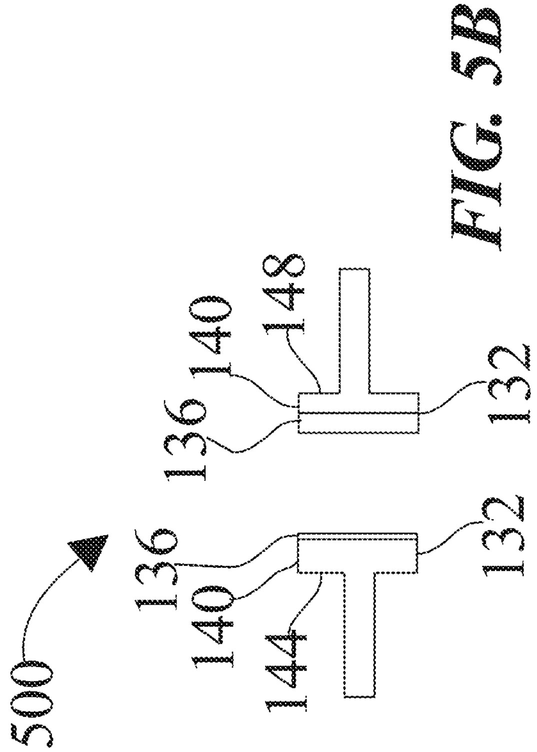

Referring now to FIGS. 5A-5B an exemplary embodiment 500 of conducting materials during formation of an arc and after extinguishing an arc are illustrated. In FIG. 5A, an exemplary embodiment 500 of conducting materials dud ng formation of an arc is illustrated. In an embodiment, arcing contacts 132 may be composed of a first conducting material or arcing layer 136 such as zinc having a vaporizing temperature from about 870 degrees Celsius to 950 degrees Celsius. In an embodiment, arcing layer 136 such as zinc may be located on outer surface of the anode arcing contact 144 and may function as the source of arc 304. In an embodiment, zinc arcing contact may contain 0.1-10 millimeters of layered contact. In such an instance, arcing layer 136 may contain a lower vaporizing point as compared to second conducting material or base layer 140. In an embodiment, base layer 140 may be composed of higher vaporizing temperature material such as steel which may have a vaporizing temperature form about 2700 degrees Celsius to 2900 degrees Celsius. In such an instance, base layer 140 may be located underneath arcing layer 136. This may assist in extinguishing arc via anode ion depletion, as arcing layer 136 may initially corrode, thereby restricting the flow of positive ions and as such causing arc resistance to grow and eventually extinguish. Steel located underneath zinc may never reach the required temperature for ion emission to support the arc as described above in more detail in FIGS. 1-5. In an embodiment, arcing contacts may have arcing layer 136 and base layer 140 thickness as well as contact area optimized based on the available short circuit level of the system and desired fault interrupting time. Arcing contacts 132 may be single use. In an embodiment, system 100 may contain several arcing contacts 132 so that other arcing contacts 132 located within system 100 may extinguish a subsequent arc.

With continued reference to FIG. 5B, an exemplary embodiment of conducting materials after extinguishment of an arc is illustrated. In an embodiment, after an arc has been extinguished, thickness of arcing layer 136 located on anode arcing contact 144 may be diminished, as first conducting material such as zinc located on arcing layer 136 has evaporated while quenching arc. In such an instance, arcing layer 136 located on cathode arcing contact 148 may be unchanged and may be of same thickness as before arc was quenched as illustrated above in FIG. 5A. Arcing layer 136 such as zinc may have a lower vaporizing temperature than base layer 140 located on anode arcing contact 144 and base layer 140 located on cathode arcing contact 148, thereby not allowing base later 140 to become exposed.

Figure 6:
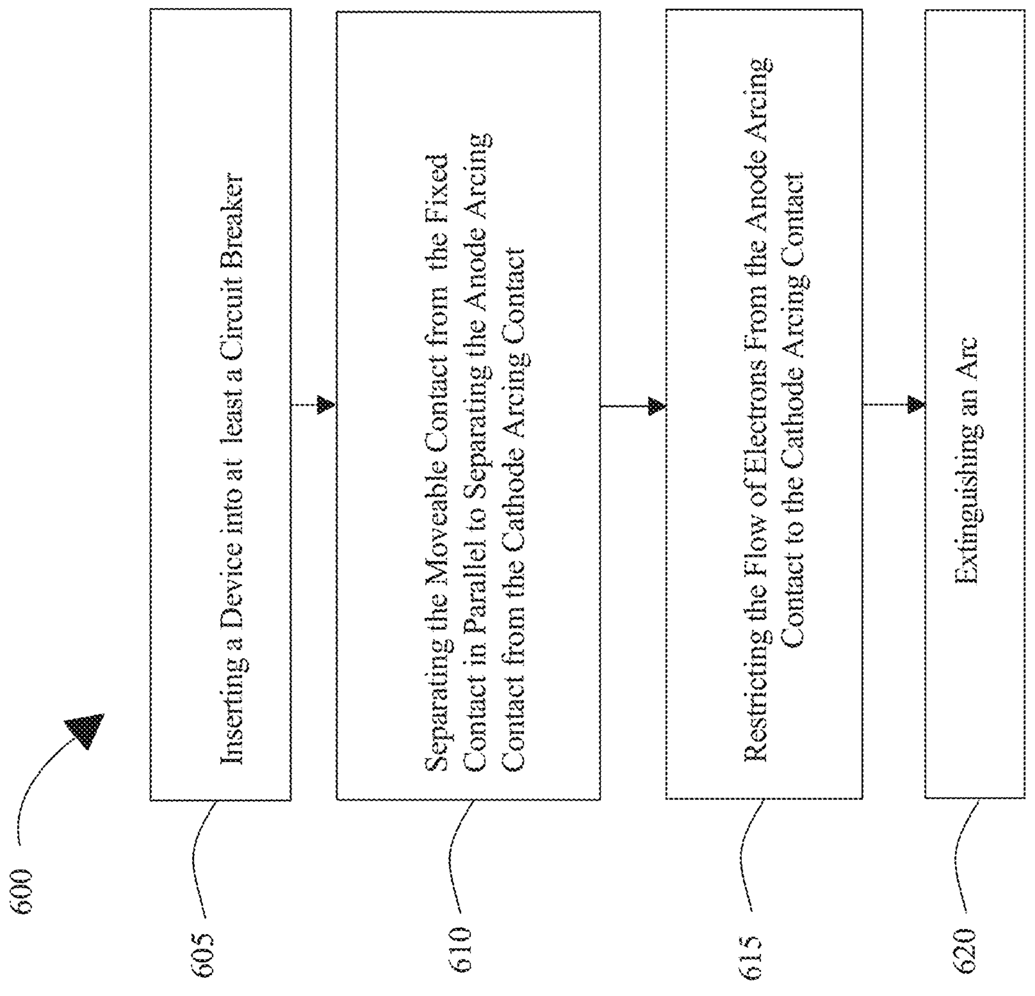
FIG. 6 is a block diagram illustrating an exemplary embodiment of a method of DC current interrupter based on thermionic arc extinction via anode ion depletion.

Referring now to FIG. 6, an exemplary embodiment of a method 600 of thermionic arc extinction via anode ion depletion is illustrated. At step 605, a system 100 for thermionic arc extinction via anode ion depletion is inserted into at least a circuit breaker. The system 100 includes a fixed terminal end 104 including at least a fixed conductor 108 containing at least a fixed conductor 108 containing at least a fixed contact 112 and a moveable terminal end 116 including at least a moveable conductor 120 containing at least a moveable contact 124 and a body including an inner compartment wherein the inner compartment includes at least an arc shield 128 housing at least two arcing contacts 132 including at least an anode contact 144 and at least a cathode contact 148. Fixed terminal end 104 including at least a fixed contact 112 may include any of the fixed terminal end 104 and fixed contact 112 as described above in reference to FIGS. 1-5. Moveable terminal end 116 including at least a moveable contact 124 may include any of the moveable terminal end 116 and moveable contacts as described above in reference to FIGS. 1-5. Circuit breaker may include any of the circuit breakers as described above in reference to FIGS. 1-5 such as for example, air-blast circuit breaker, oil circuit breaker, $SF_6$ circuit breaker, and/or vacuum circuit breaker. In an embodiment, system 100 may be inserted into at least a circuit breaker such as by mechanical features that may be contained within system 100 such as by snapping on feature, clips, hooks, bolts, screws, and the like that may allow for system 100 to be easily inserted into at least a circuit breaker. In an embodiment, arc shield 128 housing at least two arcing contacts 132 may be single use. In such an instance, after an arc has been extinguished as described in more detail below, another set of arcing contacts 132 may be utilized to extinguish a subsequent arc. Arcing contact 132 may be fabricated with a zinc coating. In an embodiment, zinc coating may be composed of steel. In an embodiment, arcing contact 132 may be single use. In an embodiment, arcing contacts 132 may be single use. In an embodiment, system 100 may contain several arcing contacts 132 so that other arcing contacts may be used to extinguish a subsequent arc after a set of arcing contacts have been used. In an embodiment, arcing contacts 132 may be designed to facilitate interrupter replacement. In an embodiment, system 100 may include multiple arcing contacts 132 to allow for more than one use. In such an instance, other arcing contacts 132 located within system 100 that have not been utilized may be able to quench and extinguish an arc that subsequently forms.

With continued reference to FIG. 6, at step 610, moveable contact 124 is separated from fixed contact 112 in parallel to separating the anode arcing contact 144 from the cathode arcing contact 148. Separating as used herein includes physically separating at least a contact from at least another contact so that an insulating gap 152 is formed. Insulating gap 152 may include a medium or space that physically separates at least a contact from another contact. Insulating gap 152 may include a medium such as air, vacuum, oil, sulfur hexafluoride, and/or any electrically insulating fluid. Parallel may include separating moveable contract 124 from fixed contact 112 simultaneously to anode arcing contact 144 separating from cathode arcing contact 148. Separation may occur by a spring force such as the one described above in reference to FIG. 1. Separation may be operated by a switch, such as the switch as described above in reference to FIG. 1. Switch may include for example, an electrical switch and/or a mechanical switch. Separation may be operated by an external operating mechanism that may drive the moving contact, thereby opening and/or closing the connected circuit. Moving contact may be operated by for example push buttons, switches, mechanical pressure, sensors, electromechanical relays, and the like.

With continued reference to FIG. 6, at step 615 the flow of electrons are restricted from the anode arcing contact 144 to the cathode arcing contact 148. Anode arcing contact 144 and cathode arcing contact 148 may include any of the arcing contacts 132 as described above in FIGS. 1-5. Electron flow may be restricted by separation of anode arcing contact 144 and cathode arcing contact 148 and upon formation of insulating gap 152 between anode arcing contact 144 and cathode arcing contact 148. Upon separation, zinc plated anode arcing contact 144 and zinc plate cathode arcing contact 148 will draw an arc. Arc will be sustained as an ample supply of positive ions and positive electrons flow from the anode arcing contact 144 and an ample supply of negative ions and negative electrons flow from the cathode arcing contact 148. However, supply will start to reduce as anode arcing contact 144 and cathode arcing contact 148 are physically separated. Zinc plated anode arcing contact 144 will corrode as zinc has a lower vaporizing point than steel located underneath the surface of the zinc, thus increasing arc resistance and ultimately extinguishing the arc. In an embodiment, high current densities present during opening of arcing contact 132 opening due to high current flow may result in heating of the zinc plated arcing surface and release of metal vapor and resulting arc that forms. As the arc is formed, arc resistance will be zero and current may continue to flow through the arc plasma and arcing anode contact 144 and arcing cathode contact 148. The arc may transition to thermionic state with metal vapor continuing to be released from anode arcing contact 144 and cathode arcing contact 148. Current will continue to flow through the arc as long as positive ions and electrons flow from the anode arcing contact 144 to the cathode arcing contact 148. Current flow will cause corrosion of arcing contact 132 surface which will cause zinc to restrict positive ion flow at arcing contact 132, thus causing arc resistance to grow and the arc to eventually extinguish. Steel located below surface of zinc surface may never reach the required temperature for ion emission to support the arc as steel has a higher vaporizing point than zinc. In an embodiment, zinc plated thickness and contact area may be optimized based on the available short circuit level of the circuit as well as the desired fast fault interrupting time. In an embodiment, arcing contact 132 may be comprised of first material having first vaporizing temperature located at arcing layer 136 and second material having second vaporizing temperature located at base layer 140. In an embodiment, the zinc layer may contain sufficient depth for the arc to transition to the thermionic state after full contact separation. The rate of zinc corrosion may depend on the magnitude of the arc current. In an embodiment, anode arcing contact containing arcing layer 136 may reduce in thickness after extinguishment of arc. In an embodiment, anode arcing contact 144 and cathode arcing contact 148 may be single use.

With continued reference to FIG. 6, at step 620 the arc is extinguished. The arc may be extinguished when arc resistance increases as flow of electrons decreases between anode arcing contact 144 and cathode arcing contact 148. In an embodiment, arc may be extinguished when zero crossing exists. Zero crossing may include a condition where zero electrons and zero ions cross between anode arcing contact 144 and cathode arcing contact 148. In an embodiment, system 100 may be utilized to extinguish an arc that may form in either an AC or DC circuit.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A current interrupter, the current interrupter comprising:

a fixed terminal end;

a moveable terminal end; and at least two arcing contacts, wherein the two arcing contacts include at least an anode contact and at least a cathode contact and wherein the at least two arcing contacts are fabricated with a first conducting material having a first vaporizing temperature and a second conducting material having a second vaporizing temperature, wherein the first vaporizing temperature is lower than the second vaporizing temperature.

2. The current interrupter of claim 1, wherein a first arcing contact of the at least two arcing contacts comprises a base layer and an arcing layer, wherein a distance from the arcing layer to a second arcing contact of the at least two arcing contacts is less than a distance from the base layer to the second arcing contact.

3. The current interrupter of claim 2, wherein the arcing layer is composed of the first conducting material and the base layer is composed of the second conducting material.

4. The current interrupter of claim 1, wherein the fixed terminal end comprises a fixed conductor containing a fixed contact.

5. The current interrupter of claim 1, wherein the moveable terminal end comprises a moveable conductor containing a moveable contact.

6. The current interrupter of claim 5, wherein the moveable contact is movable using a switch.

7. The current interrupter of claim 5, wherein the moveable contact is movable using a spring.

8. The current interrupter of claim 1 wherein the moveable contact is movable using an electrical control.

9. The current interrupter of claim 1 wherein the at least two arcing contacts comprise a moving arcing contact and a fixed arcing contact.

10. The current interrupter of claim 1, wherein the at least two arcing contacts further comprise an elastically deformed shape.

11. A system for isolating a fault in a direct current (DC) grid using thermionic arc extinction, the system comprising:
- a direct current (DC) grid, said DC grid comprising:
  - a transmission line; and
  - at least a current interrupter disposed on the transmission line, wherein the at least one of the current interrupters comprises:
    - a fixed terminal end;
    - a moveable terminal end; and
    - at least two arcing contacts, wherein the two arcing contacts include at least an anode contact and at least a cathode contact and wherein the at least two arcing contacts are fabricated with a first conducting material having a first vaporizing temperature and a second conducting material having a second vaporizing temperature, wherein the first vaporizing temperature is lower than the second vaporizing temperature.

12. The system of claim 11, wherein a first arcing contact of the at least two arcing contacts comprises a base layer and an arcing layer, wherein a distance from the arcing layer to a second arcing contact of the at least two arcing contacts is less than a distance from the base layer to the second arcing contact.

13. The system of claim 12, wherein the arcing layer is composed of the first conducting material and the base layer is composed of the second conducting material.

14. The system of claim 13, wherein the moveable contact comprises a switch.

15. The system of claim 11, wherein the fixed terminal end comprises a fixed conductor containing a fixed contact.

16. The system of claim 11, wherein the moveable terminal end comprises a moveable conductor containing a moveable contact.

17. The system of claim 11, wherein the transmission line is configured to transmit power having a voltage magnitude between 100V and 1 MV.

18. The system of claim 11, wherein the grid is configured to charge an electric vehicle.

19. The system of claim 11, wherein the grid is implemented within a shipboard power system.

20. The system of claim 11, wherein the grid is electrically coupled to a solar panel.

* * * * *